US009275545B2

(12) United States Patent  
Hart, Jr. et al.

(10) Patent No.: US 9,275,545 B2  
(45) Date of Patent: Mar. 1, 2016

(54) SYSTEM AND METHOD FOR MONITORING VEHICLE TRAFFIC AND CONTROLLING TRAFFIC SIGNALS

(71) Applicants: John Felix Hart, Jr., Granite Falls, NC (US); Christopher Edmond Aiken, Hudson, NC (US)

(72) Inventors: John Felix Hart, Jr., Granite Falls, NC (US); Christopher Edmond Aiken, Hudson, NC (US)

( * ) Notice: Subject to any disclaimer, the term of this patent is extended or adjusted under 35 U.S.C. 154(b) by 40 days.

(21) Appl. No.: 14/214,337

(22) Filed: Mar. 14, 2014

(65) Prior Publication Data

US 2014/0267734 A1 Sep. 18, 2014

Related U.S. Application Data

(60) Provisional application No. 61/781,738, filed on Mar. 14, 2013.

(51) Int. Cl.
| | |
|---|---|
| *H04N 7/18* | (2006.01) |
| *G08G 1/07* | (2006.01) |
| *G06K 9/00* | (2006.01) |

(52) U.S. Cl.  
CPC .............. *G08G 1/07* (2013.01); *G06K 9/00785* (2013.01)

(58) Field of Classification Search  
CPC ....... H04N 7/18; G06K 9/00771; G06K 9/00; G08B 13/196; G08G 1/07  
USPC .......................................................... 348/149  
See application file for complete search history.

(56) References Cited

U.S. PATENT DOCUMENTS

| 4,847,772 | A | 7/1989 | Michalopoulos et al. |
| 5,161,107 | A | 11/1992 | Mayeaux et al. |
| 5,444,442 | A | 8/1995 | Sadakata et al. |
| 7,646,311 | B2 | 1/2010 | Afzulpurkar et al. |
| 7,689,347 | B2 | 3/2010 | Wall, III |
| 7,953,546 | B1 | 5/2011 | Wall, III |
| 2006/0095199 | A1* | 5/2006 | Lagassey ...................... 701/117 |
| 2009/0167562 | A1 | 7/2009 | Liang |
| 2010/0321210 | A1 | 12/2010 | Lee et al. |
| 2012/0307065 | A1* | 12/2012 | Mimeault et al. ............. 348/149 |

FOREIGN PATENT DOCUMENTS

WO    WO-2009/126120 A1    10/2009

* cited by examiner

*Primary Examiner* — Mehrdad Dastouri  
*Assistant Examiner* — Kristin Dobbs  
(74) *Attorney, Agent, or Firm* — Christopher C. Dremann, P.C.; Christopher C. Dremann (57) ABSTRACT

A system and method for monitoring objects, such as vehicle traffic, and controlling a flow of the objects, such as vehicle traffic, through a flow point, such as an intersection having traffic control signals. At least one three-dimensional (3D) vector imaging sensor is operable for detecting an object and capturing node-based object with motion vector data relating to the object. A Sensor Processing Unit (SPU) is associated with the vector imaging sensor(s) and operable for processing the mode-based object with motion vector data, determining a tracked object from a plurality of the objects detected by the vector imaging sensor(s) and extracting the object data of the tracked object to an object database. A Central Tracking Unit (CTU) is associated with the SPU and operable for classifying the tracked object, generating object tracking data from the tracked object, predicting a future object state of the tracked object, and generating an object control output for controlling a control signal to thereby facilitate the flow of the objects through the flow point.

18 Claims, 4 Drawing Sheets

SYSTEM AND METHOD FOR MONITORING VEHICLE TRAFFIC AND CONTROLLING TRAFFIC SIGNALS

CROSS-REFERENCE TO RELATED APPLICATION

This United States non-provisional application claims the benefit of priority of U.S. Provisional Application No. 61/781,738 filed on Mar. 14, 2013, the entire disclosure of which is incorporated herein by reference.

FIELD OF THE INVENTION

The present invention relates generally to a system and method for monitoring the movement or flow of objects, and controlling future movements of the objects so as to avoid collisions or facilitate the movement or flow of the objects. More specifically, the invention is a system and method for detecting and identifying objects at or in the vicinity of an intersection, monitoring the movements of the objects, predicting future movements of the objects, and controlling the future movements of the objects. In various embodiments, the system and method utilizes one or more three-dimensional (3D) vector imaging sensors to collect real-time three-dimensional (3D) node-based object with motion vector data and analyzes the data to anticipate movements of the objects for the purpose of controlling the flow of the objects.

As used herein, the term "node-based object" is intended to mean a vector image comprised of paths defined by a start point and an end point, along with other points, curves, lines and angles, referred to as "nodes," each of which is based on a mathematical expression. Because node-based objects are vector images, as opposed to bitmaps or raster images made up of a specific, typically large, number of dots or pixels, the node-based objects can be scaled to any size without loss of image quality and resolution. As used herein, the term "motion vector data" is intended to mean the accumulation of a node-based object's speed, size, direction, etc. data represented as a graphically numerical value. A node-based object with motion vector data is also referred to herein as a "tracked object."

The uniqueness of the present invention is attributable to the concept of a tracking object. As used herein, a "tracking object" is intended to be defined by a set of data in which a node-based object's size, shape, position, current direction of motion, predicted future direction of motion, etc. are represented by a series of three-dimensional (3D) vectors rather than a raster image or group of pixels. By using vector data to represent an object that is to be monitored (i.e. tracked) and analyzed, the amount of data required to represent the object is greatly reduced and the ability to predict the object's future position or state, for example velocity, acceleration, etc., is significantly enhanced. A tracking object is maintained as a list of two or more three-dimensional (3D), or three-space, positions of nodes from which an object may be mathematically rendered, scaled and/or processed to determine current position and to predict future positions of the object for the purpose of facilitating movements of the object and/or avoid collisions with other objects.

In particularly advantageous embodiments, the invention is a system and method for monitoring vehicle traffic and controlling traffic signals at an intersection to provide real-time traffic surveillance and traffic signal control, thereby improving the efficiency of the flow of traffic at the intersection. In specific embodiments, the system and method utilizes one or more three-dimensional (3D) vector imaging sensors to identify the size, location, speed and direction of travel of different objects and to monitor movements of the objects at or approaching the intersection. The vector data is then transmitted to a central processing unit (CPU), ladder logic computer (LLC), proprietary digital signal processor, or the like, and analyzed to anticipate object movements, for example vehicle traffic. The information is then used to control a traffic signal to maximize the safety and efficiency of the flow of the vehicle traffic. The use of modular sensors at different locations to obtain and transmit the node-based object with motion vector data to a central processing unit (CPU) allows the system and method to monitor and control the flow of vehicle traffic at intersections with limited line-of-sight visibility.

BACKGROUND OF THE INVENTION

The orderly and efficient movement of objects increases safety by preventing collisions and maximizes time and energy savings. Using vehicle traffic as an example, the majority of vehicle accidents occur at or in the vicinity of an intersection where roadways converge or cross. In addition, time and energy (e.g. momentum, fuel, battery power, etc.) is wasted by vehicles idling at an intersection needlessly waiting for a traffic signal to provide a legal right-of-way for the vehicle to proceed. Furthermore, traffic congestion is increased by traffic signals that are not responsive to real-time vehicle traffic and weather conditions, leading to frustration and potential "road-rage" among vehicle operators.

Numerous different systems and methods have been developed and deployed for monitoring and/or controlling vehicle traffic at an intersection. Timers have long been used to facilitate the flow of traffic through an intersection by controlling the operation of a traffic signal. For example, a timer can be programmed to change a traffic signal at predetermined intervals of time based on a study of the vehicle traffic at an intersection over an extended period. However, timers passively control the traffic signal according to historical traffic patterns instead of real-time vehicle traffic. Furthermore, timers do not account for atypical weather conditions, or for accidents and other randomly occurring events along the roadways converging at the intersection, such as slow-moving vehicles and pedestrian traffic. In addition, timers are subject to malfunction, which can lead to a disruption of the flow of traffic and potentially an interruption in the synchronization with other traffic signals along the roadways until proper operation of the timer is restored.

It is also known to utilize electrical or mechanical triggers to monitor vehicle traffic and control the operation of a traffic signal, especially in a rural area and at an intersection for a cross street having significantly less vehicle traffic than the through street. Most such intersections utilize loops or coils of wire buried within or beneath the roadway to trigger a traffic control signal. When a metal object, such as a vehicle, passes over the loops or coils of wire, an electrical charge is created that triggers the traffic control signal to change after a predetermined time. Mechanical triggers include weight (pressure) sensors or magnets positioned within or beneath the roadway approaching the intersection. The weight sensor or magnet detects the presence of a vehicle stopped on the cross street waiting to enter the intersection and changes the traffic signal after a predetermined time to allow the stopped vehicle to proceed safely through the intersection. As a result, existing triggers are merely reactive to the physical presence of a vehicle at an intersection and do not anticipate the volume of arriving vehicles and change the traffic signal in advance. Oftentimes, the trigger is configured with a delay to account for a vehicle that stops momentarily at the intersection before performing a right turn on a red light traffic signal in instances that a "right turn on red" is permitted. Similarly to a timer, a traffic signal trigger may be configured to be overridden and operated by a transient signal, for example an electrical, optical, radio frequency (RF), ultrasound or the like signal, transmitted by an emergency vehicle to allow the emergency vehicle to proceed through the intersection without stopping for a red light traffic signal.

It is also known to utilize optical images obtained from one or more photo and/or video cameras positioned in the vicinity of an intersection to monitor and control a traffic signal at the intersection. However, photo and video cameras record bitmap, or raster, images defined by a series of pixels that require large amounts of computation power, time and data storage, even for two-dimensional (2D) landscape images that lack sufficient accuracy and resolution for efficient traffic surveillance and control. As a result, the algorithms currently available for processing optical images recorded by photo and video cameras are not fast enough to control a traffic signal in response to real-time vehicle and pedestrian traffic, let alone real-time ambient weather conditions. Furthermore, because existing cameras lack the ability to discern depth, they fail to provide a true three-dimensional (3D) rendering of the area surrounding the intersection. In addition, conventional photo and video camera surveillance systems lack the capability to analyze vehicle traffic and accurately predict vehicle movements and traffic patterns without human intervention. As a result, such systems and methods are uneconomical and impractical for monitoring and controlling the flow of vehicle traffic at less traveled intersections, for example rural intersections.

In view of the desirability for orderly and efficient movement of objects, and in particular vehicles and pedestrians through an intersection, a system and method is needed for monitoring vehicle traffic and controlling traffic signals that increases safety and maximizes time and energy savings. More specifically, a system and method is needed that monitors vehicle traffic and controls a traffic signal in response to real-time vehicle traffic and real-time ambient weather conditions. There exists a further need for such a system and method that does not require a large amount of computation power, time and data storage, yet operates in a fast, accurate and reliable manner. There exists a particular need for a system and method for monitoring vehicle traffic and controlling traffic signals that operates autonomously, and therefore, is economical and practical for use at less traveled intersections.

SUMMARY OF THE INVENTION

In an exemplary embodiment, the invention is a system for monitoring objects and controlling a flow of the objects through a flow point. The exemplary system includes at least one three-dimensional (3D) vector imaging sensor operable for detecting an object and capturing object data relating to the object. The system further includes a Sensor Processing Unit (SPU) associated with the three-dimensional (3D) vector imaging sensor(s) and operable for processing the object data relating to the object detected and captured by the vector imaging sensor(s). The SPU is further operable for determining a tracked object from a plurality of the objects and for extracting the object data of the tracked object. The system further includes a Central Tracking Unit (CTU) associated with the SPU and operable for classifying the tracked object and for generating object tracking data from the tracked object. The CTU is further operable for predicting a future object state of the tracked object and for generating an object control output for controlling a control signal to thereby facilitate the flow of the objects through the flow point.

In one aspect of the exemplary embodiment, the three-dimensional (3D) vector imaging sensor is selected from the group of sensors consisting of a LIDAR, radar, microwave, ultrasonic distance, stereoscopic imaging and a time-of-flight (TOF) camera sensor. In another aspect, the three-dimensional (3D) vector imaging sensor is operable to determine the position, size, shape and current state of the tracked object.

In yet another aspect of the exemplary embodiment, the object data relating to the object detected and captured by the three-dimensional (3D) vector imaging sensor is node-based object with motion vector data. In another aspect, the three-dimensional (3D) vector imaging sensor provides the node-based object with motion vector data to the SPU.

In another exemplary embodiment, the invention is a system for monitoring vehicle traffic and for controlling a traffic signal at an intersection. The exemplary system includes at least one three-dimensional (3D) vector imaging sensor configured for detecting an object and capturing object data consisting of node-based object with motion vector data relating to the object. The system further includes a Sensor Processing Unit (SPU) associated with the three-dimensional (3D) vector imaging sensor and operable for processing the object data. The SPU is further operable for determining a tracked object from a plurality of the objects and for extracting the object data of the tracked object. The system further includes a Central Tracking Unit (CTU) associated with the SPU and operable for classifying the tracked object and for generating object tracking data from the tracked object. The CTU is further operable for predicting a future object state of the tracked object and for generating an object control output for controlling the traffic control signal to thereby facilitate the flow of vehicle traffic through the intersection.

In still another exemplary embodiment, the invention is a method for monitoring vehicle traffic and controlling a traffic signal at an intersection. The exemplary method includes providing at least one three-dimensional (3D) vector imaging sensor. The method further includes providing a Sensor Processing Unit (SPU) operably associated with the three-dimensional (3D) vector imaging sensor. The method further includes using the three-dimensional (3D) vector imaging sensor to detect an object and capture object data consisting of node-based object with motion vector data relating to the object. The method further includes providing the node-based object with motion vector data to the SPU. The method further includes using the SPU to process the object data, to determine a tracked object from a plurality of the objects, and to extract the object data of the tracked object to an object database. The method further includes providing a Central Tracking Unit (CTU) operably associated with the SPU. The method further includes using the CTU to classify the tracked object, to generate object tracking data from the tracked object, to predict a future object state of the tracked object, and to generate an object control output for controlling the traffic control signal to thereby facilitate the flow of vehicle traffic through the intersection.

BRIEF DESCRIPTION OF THE DRAWING FIGURES

The present invention, as well as its features, objects and advantages set forth herein, will be better understood and appreciated when considered in light of the detailed description provided herein and the accompanying drawing figures, wherein like reference characters indicate the same or similar parts, elements, components, assemblies or subassemblies.

DETAILED DESCRIPTION OF EXEMPLARY EMBODIMENTS OF THE INVENTION

Exemplary embodiments of the present invention will be described more fully hereinafter with reference to the accompanying drawing figures. However, it is to be understood that the invention may be embodied in many different forms and should not be construed as limited to the exemplary embodiments set forth herein. Exemplary embodiments of the invention are presented herein so that the disclosure of the invention will fully and completely convey the intended scope of the invention, while enabling one of ordinary skill in the art to make, use and practice the invention without undue experimentation. As previously mentioned, like reference characters in the detailed description and the various drawing figures refer to the same or similar parts, elements, components or assemblies of the invention.

In exemplary embodiments, the invention is a system and method operable for detecting and capturing node-based object with motion vector data related to one or more tracked objects, monitoring movements of the tracked objects, predicting future movements of the tracked objects, and controlling the flow of the tracked objects along a flow path in a safe and efficient manner. In a particularly advantageous embodiment, the system and method is operable for monitoring vehicle traffic and controlling traffic signals at an intersection to move vehicles safely through the intersection with minimum expenditure of time and energy. As previously discussed, existing systems and methods based on timers, triggers and/or cameras merely react to the presence of a vehicle at an intersection and only control a traffic signal after a vehicle has stopped at the intersection. In contrast, a system and method for monitoring vehicle traffic and controlling traffic signals according to the present invention "anticipates" the flow of vehicle traffic approaching an intersection and controls the traffic signals in advance to facilitate the flow of vehicle traffic in a safe and efficient manner. As a result, a system and method according to the invention avoids collisions between vehicles and dramatically reduces carbon emissions from vehicles needlessly stopping and idling at an intersection, as well as subsequently accelerating away from the intersection. While the invention is described in greater detail hereinafter with reference to vehicle and pedestrian traffic at an intersection of converging or crossing roadways, the principles, operation and function of the invention can be applied to various situations in which it is desirable to control the movement of objects to avoid collisions between objects and to limit the amount of time required for objects to traverse a flow path. By way of example and not limitation, a system and method according to the present invention may be utilized to monitor and control the movement of packages or products through a conveyor transportation system, or alternatively, to monitor and control the movement of robotic vehicles in a manufacturing or assembling area of a production facility.

As illustrated and described herein, a system and method according to the present invention may include one or more three-dimensional (3D), vector-based sensors configured to directly determine the size, shape, speed, direction of travel, etc. of an object, such as a vehicle, pedestrian or obstruction, to be monitored in the vicinity of an intersection of converging or crossing roadways. The vector-based sensor may be any type of conventional sensor, for example LIDAR, radar, microwave, ultrasonic distance, stereoscopic imaging, time-of-flight (TOF) camera, or the like. Regardless, each sensor is operable to detect and measure the object to be monitored, and to provide a direct position and motion output for node-based object with motion vector data related to the object.

In various embodiments, the sensor may comprise a discrete position sensor, or alternatively, may comprise a sensor and associated processing hardware, such as a central processing unit (CPU). Regardless, the sensor is configured to provide vector-based motion outputs to the system and method for controlling the movement of objects along a flow path. The sensors may include connectivity that allows the sensor to be used as a single, stand-alone data source. Alternatively, multiple sensors may be operably connected together by the system and subsequent processing elements to form larger "virtual" sensors from which size, shape, position and motion data can be determined.

In still other embodiments, one or more physical sensors and one or more "virtual" sensors may be operably connected together to provide real-time information that allows precise size, shape, speed, distance and motion data to be determined for multiple objects in a flow path. Each object may be detected by one or more physical or "virtual" sensors with size, shape, absolute position and motion vector information maintained both locally by the individual sensor(s) and/or processed by a higher level digital processing node.

In still other embodiments, the system may comprise one or more digital processing nodes, or CPUs, that are configured to collect, manipulate, filter and compare motion vector data to provide size, shape, speed, classification, distance and motion information for each object that is detected. The digital processing nodes may be operably connected to one or more physical sensors or "virtual" sensors such that a mesh of nodes is formed. The mesh may comprise a single digital processing element (e.g. CPU), or alternatively, may comprise a plurality of nodes that are operably connected together in hierarchical levels to process individual objects or flow paths.

Furthermore, in other embodiments, the digital processing nodes, or CPUs, may be arranged such that a single object is monitored, tracked, processed and maintained by multiple digital processing nodes. In this manner, a single object may be measured by one or more sensors, and may be monitored, tracked and maintained by multiple processing nodes. As a result, the system can provide improved object movement predictions and provide redundancy so that objects can be monitored and tracked despite the failure of one or more sensors or processing nodes during operation.

In still other embodiments, the system may comprise one or more additional parameters to influence the processing of object information. For example, the parameters may be related to minimum or maximum object size, minimum or maximum object speed, and/or minimum or maximum object distance. Alternatively, or in addition, the parameters may relate to minimum or maximum change in the object motion vector, or any other measured or derived characteristic of the object. The system may further comprise parameters that relate to system performance, such as a limit on the total number of objects that are monitored and tracked. In another exemplary embodiment, the system may comprise parameters that determine how objects are concatenated or composited together, for example, the distance between objects and the comparative similarity, or "likeness," of the motion vectors, size and type of the objects.

The digital processing nodes may also be configured to execute one or more algorithms for measuring, calculating and maintaining object characteristics and vector motion data. The algorithms included in the system may provide the ability for the system to create and maintain object positions and expected motions in real-time. The goal of the algorithms is to create one or more predictive states for the tracked objects. The predictive states, derived from the motion vectors of one or more sensors, allows the system to determine which objects to track, and further, provides proper flow and collision avoidance for all of the tracked objects.

In still other embodiments, the system may have one or more algorithms configured to produce a control output. The control output may consist of either a simple visual indicator, for example a tri-colored traffic light, or a complex series of control data that is transmitted to the individual tracked objects, for example a wireless packet to directly control an autonomous vehicle. The system may be configured to provide one or more control signals to each tracked object, with the control signal generic to all tracked objects. Alternatively, the system may be configured to provide a custom set of specific control signals or protocols for EACH tracked object, for example custom data packets corresponding to the type or kind of the object.

In any event, the previously captured object information (e.g. size, speed, distance, motion, etc.) is processed by one of more processing nodes to track the object over time. The tracking process allows the system to not only determine the precise location of a tracked object at a given time, but also to predict with a high degree of certainty the location and speed of the tracked object at a future point in time. The ability to predict future parameters based on motion vectors represents a distinct difference and a substantial improvement in the effective collision avoidance and flow control for the tracked objects.

The aforementioned algorithms may operate at either a local (i.e. single sensor) level or may be composited to include multiple sensors and/or processing nodes. This compositing feature represents a vast improvement over previously known systems by making a system according to the present invention easily scalable to account for both fairly simple applications (e.g. few tracked objects, single flow/collision paths), or alternatively, complex applications (e.g. many tracked objects, multiple flow/collision paths). Accordingly, the design of the present invention provides for a modular, scalable system and method for detecting, monitoring, tracking, and controlling objects along a flow path or through a flow point, for example vehicle traffic at an intersection. As a result, each object path can be considered independently without limit to number of sensors, sensor technology, or typical "line-of-sight" restrictions, as will be illustrated hereinafter.

Embodiments of the invention may also comprise various means for connecting processing nodes. The means for connecting the processing nodes may be over wired connections (e.g. high speed serial or wired Ethernet connections). Alternatively, the means for connecting processing nodes may be over wireless methods (e.g. 802.11, or 802.15.4), or both. Furthermore, the system may utilize security encryption to protect the sensor data and the control data from external reception and/or manipulation.

As previously mentioned, the system may comprise one or more algorithms to create the sensor data stream(s). Single sensors or composited "virtual" sensors may be normalized by the algorithms to present the object data set (e.g. size, speed, type, location, current motion, projected motion, etc). In certain embodiments, the system allows for multiple types of algorithms to be selected as long as the output of the object information and measurements are uniformly presented by a processing node. For example, a plurality of algorithms for detecting objects, determining object type, measuring object size, determining object position, measuring object speed, calculating object motion, and predicting future object vectors may be supported by the system. In addition, the algorithms may be specialized to each type of tracked object detected by the system. For example, product algorithms might vary significantly from vehicle and pedestrian algorithms. The algorithms may also vary, or be based on, for example, lane position, time of day, weather, and other qualifiers such as rate of speed, rate of object appearance entering/exiting, object size, or other data given by higher order supervisory systems.

Furthermore, the algorithms incorporated into the system may include "self-learning" or heuristic techniques so as to cause the performance of the system to improve over time. The "self-learning" behaviors allow the system to improve the flow efficiency of tracked objects and to more reliably predict and mitigate possible object collisions. In addition, the "self-learning" features offer significant improvements given that flow patterns, and in particular vehicle traffic, are dynamic in nature and should be adjusted as the patterns change.

Using the embodiments of the invention described herein, it is possible to create dynamically configured systems for detecting and tracking (sometimes collectively referred to herein as "monitoring") objects that can be scaled automatically. This scaling may be based on the object types detected, the current tracked object position and/or rates of movement, or the current prediction of future state(s) that would require the system to gather and analyze additional data to provide the best flow and/or collision avoidance decisions.

An overview of an exemplary embodiment of a system configured in accordance with the invention can be generally organized into the three functional elements described immediately hereinafter.

Sensor Processing Units (SPUs): The SPUs are normally responsible for the capture, detection, tracking, processing, and information maintenance of discrete tracked objects to be monitored. The SPUs may comprise single sensors and single locally connected CPU elements. Alternatively, the SPUs may comprise multiple sensors and multiple local or remote processing nodes. The organization of SPUs may be tailored to the specific type(s) of tracked object(s) to be monitored, and the specific class of flow path control required. For example, the configuration for a simple flow control of autonomous vehicles or robotic transporters in a factory setting may vary significantly as opposed to the configuration for a complex, multi-lane, vehicle traffic intersection. Furthermore, the SPU(s) may be organized as a mixture of types to best capture, detect, measure, and track the objects required for a particular flow task. An SPU may be operable to locally capture, detect and measure objects. Alternatively, an SPU may utilize one or more other SPUs, Distributed Tracking Units (DTUs) and/or Centralized Tracking Units (CTUs), as defined hereinafter, to derive/confirm object position, object size, or other object related data. An SPU may also retrieve data from one or more other SPU(s) or tracking nodes to gain context data for the object. The context data may be used to better implement dynamics, "self-learning" or heuristic behaviors and/or algorithms. In addition, an SPU may provide data streams to one or more other SPUs, or to one or more DTUs and/or CTUs, or further, directly to objects or vehicles currently detected and being tracked locally.

Distributed Tracking Units/Centralized Tracking Units (DTUs/CTUs): In addition, exemplary embodiments of a system configured in accordance with the invention may comprise one or more tracking units. The tracking units may be either distributed or centralized, or both, depending on the specific flow or tracking requirements for a given set of tracked object types. A tracking unit may comprise one or more local or remote processing elements that can assist in the classification and tracking of an object of interest. A tracking unit is normally responsible for maintaining higher order data for objects such as predictive future object positions, and/or for assisting in the further classification of objects detected by the one or more SPU(s). Tracking units, either distributed or centralized may make flow control decisions as needed to maintain the efficient flow of tracked objects and/or to prevent collisions between tracked objects in intersecting paths. The tracking units may be distributed so that hierarchical structures can be maintained. Hierarchical organization allows for the efficient processing of objects in complex scenarios where the number or frequency of objects is significantly higher or varying greatly. In an exemplary embodiment, the system may comprise one or more optional DTUs and (at the minimum) a single CTU operable to coordinate final control action for the flow point(s). Another embodiment of the system may comprise more than a CTU so as to provide for fail-safe operation or roll-over operation in the event of a failure. In other exemplary embodiments, the system also allows for DTUs to make localized control decisions for certain types of objects. By way of example, a DTU might be operable to make a local decision regarding the flow control signals that are sent directly to a tracked object based on its current processing without the need to await a decision from the main CTU(s). Such interaction might be a "slow-down" or "prepare-to-stop" request to an autonomous vehicle, or similarly, a visual indicator (e.g. yellow flashing lamp) sent to a group of vehicles before a final flow decision is rendered by the CTU(s). In addition, multiple DTU(s) and/or CTU(s) may be operably connected to one or more of the same SPU(s) to form different tracking and processing views of a group or object set. In this manner, hierarchical and/or star topologies may exist for the same flow point. The different views provide the system with both redundancy and algorithmic diversity, creating both safe and highly efficient analysis processing for multiple tracked objects.

Network Processing Units (NPUs): Finally, embodiments of the system may comprise specialized communication or network processing units (NPUs) to allow for timely and efficient processing of flow decisions for tracked objects. An NPU may comprise one or more processing elements, either local or remote, that act as a communication processing or routing element within the system. An NPU is responsible for receiving, filtering, prioritizing, routing, and transmitting object or state data amongst all node types. For example, an NPU may receive data from one or more SPUs, DTUs, or CTUs, and be responsible for redistributing the data to other SPUs, DTUs, or CTUs, or even other NPUs, based on decision requirements or critical state advisement. By way of example, an NPU may receive a fault packet from an SPU/DTU/CTU, and may distribute this advisement to all reachable nodes as a priority. An NPU may also act as a filtering point in the system to keep local SPU/DTU communication traffic from reaching disinterested elements of the complete system. This filtering function allows for communication bandwidth efficiency by reducing unneeded transactions between nodes. In addition, an NPU may be used to bridge, extend, or expand communications from a system according to the invention to other systems by acting as a protocol convertor. In this manner, the invented system can be operable to connect to legacy equipment and/or to participate in larger control schemes.

The aforementioned elements of the system, namely SPUs, DTUs/CTUs and NPUs, are described herein as functional elements that can be realized in many different forms and by many different methods. In simple forms of the system, it would be common for a single processing element (i.e. CPU) to act as the SPU, DTU and/or CTU, and NPU concurrently. In more complex forms of the system, it would be likely that multiple sensing and processing elements would exist with a single processing element acting as a dedicated element, such as a discrete SPU, or a discrete CTU. The partitioning of functions allows the system to scale over many problems sets, from simple to complex, while maintaining similar design and data commonality.

Given the definitions provided herein, a system according to the present invention comprises at least one SPU and a CTU. Further embodiments of a system according to the invention may comprise one or more SPUs, at least one DTU and a CTU. Still further embodiments of a system according to the invention may comprise one or more SPUs, one or more DTUs, one or more CTUs and an NPU. The composition of the system may be simple or complex, and may be physically realized using one or more digital processing elements as necessary to timely and efficiently capture, detect, measure, track, and control one or more tracked object types along a flow path or through a flow control point, for example an intersection of converging or crossing roadways. Furthermore, the invention does not require that a tracked object be stopped, or that a lane of a flow path be stopped or blocked. The various embodiments of the system described herein and associated algorithms allow for objects to be controlled by influencing the speed and/or direction of the tracked object, and thereby affect the predicted motion of the tracked object in order to avoid further collisions or stoppages.

The present invention uses motion vector data derived, maintained, and analyzed by the proposed system to determine the predictive position of tracked objects at some future state, and creates control outputs to try to influence these states so that the objects are efficiently controlled and flows efficiently maintained across object groups. Unlike existing systems, a system configured in accordance with the present invention improves upon the state of the art by using motion vector data from tracked objects to predict and control future object states. The system improves upon existing designs by providing a method to encapsulate multiple types of sensor technologies to create common motion vector data. This allows for the future state of tracked objects to be predicted consistently even though the underlying sensor technologies can vary or be improved over time.

A system configured in accordance with the present invention enhances accuracy and efficiency since future states may be governed by heuristic, "self-learning" or dynamic algorithms that allow the system to not only insure the safe passage of objects, but also to control the efficiency of such passages. Efficiency of passage can be dynamically determined by the system based on conditions such as fuel efficiency, transit time, wait time, and/or collision risks, for example object spacing or congestion. Since the system is modular in design and scalable in implementation, the present invention allows for flow control to be extended as needed by both technology and distance. Existing systems typically track objects with a specific technology, for relatively short distances, prior to a flow control point, such as an intersection. This approach dramatically limits the effectiveness of the future states that can be influenced or controlled. Furthermore, the system of the present invention provides for multiple types of sensors, and for sensing (detecting) and tracking to be extended based on a physical lane position, rate of objects, object classification, and current or future predicted states.

Figure 1:
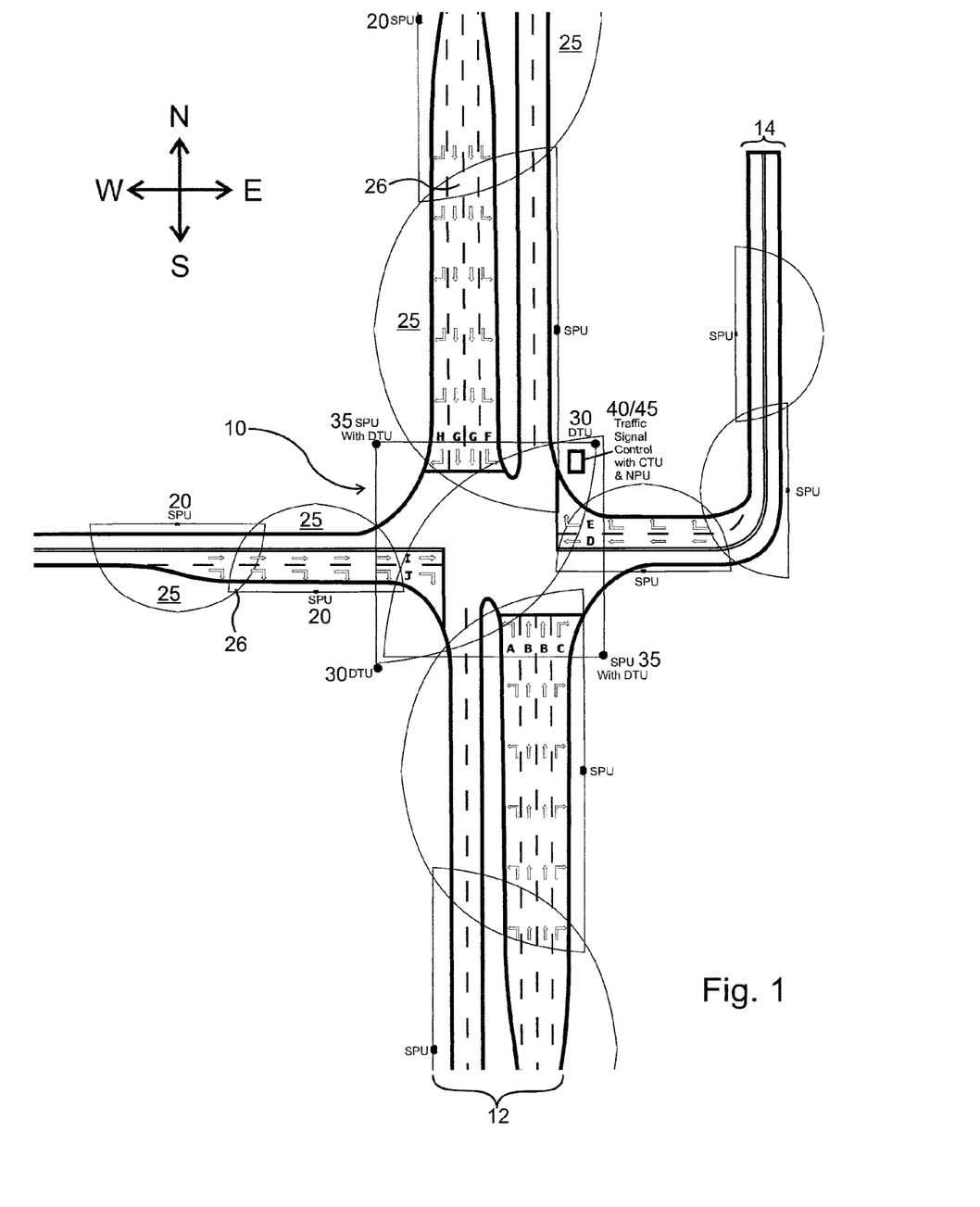
FIG. 1 is a schematic diagram illustrating an intersection of converging roadways configured with a system and method for monitoring vehicle traffic and controlling traffic signals according to the present invention.
Figure 2:
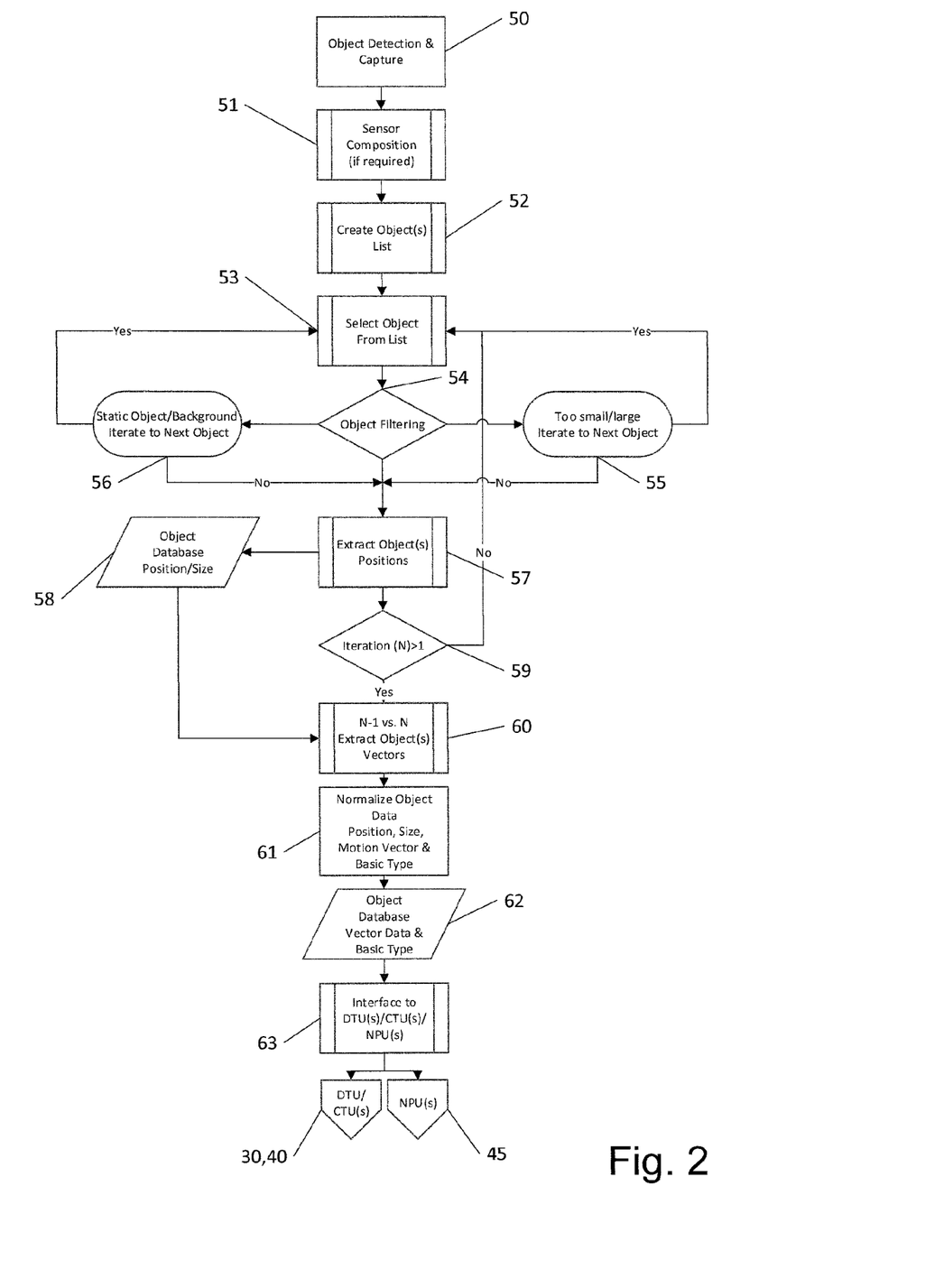
FIG. 2 is a flow chart depicting the operation and functionality of a typical Sensor Processing Unit (SPU) of the system and method illustrated by FIG. 1.
Figure 3:
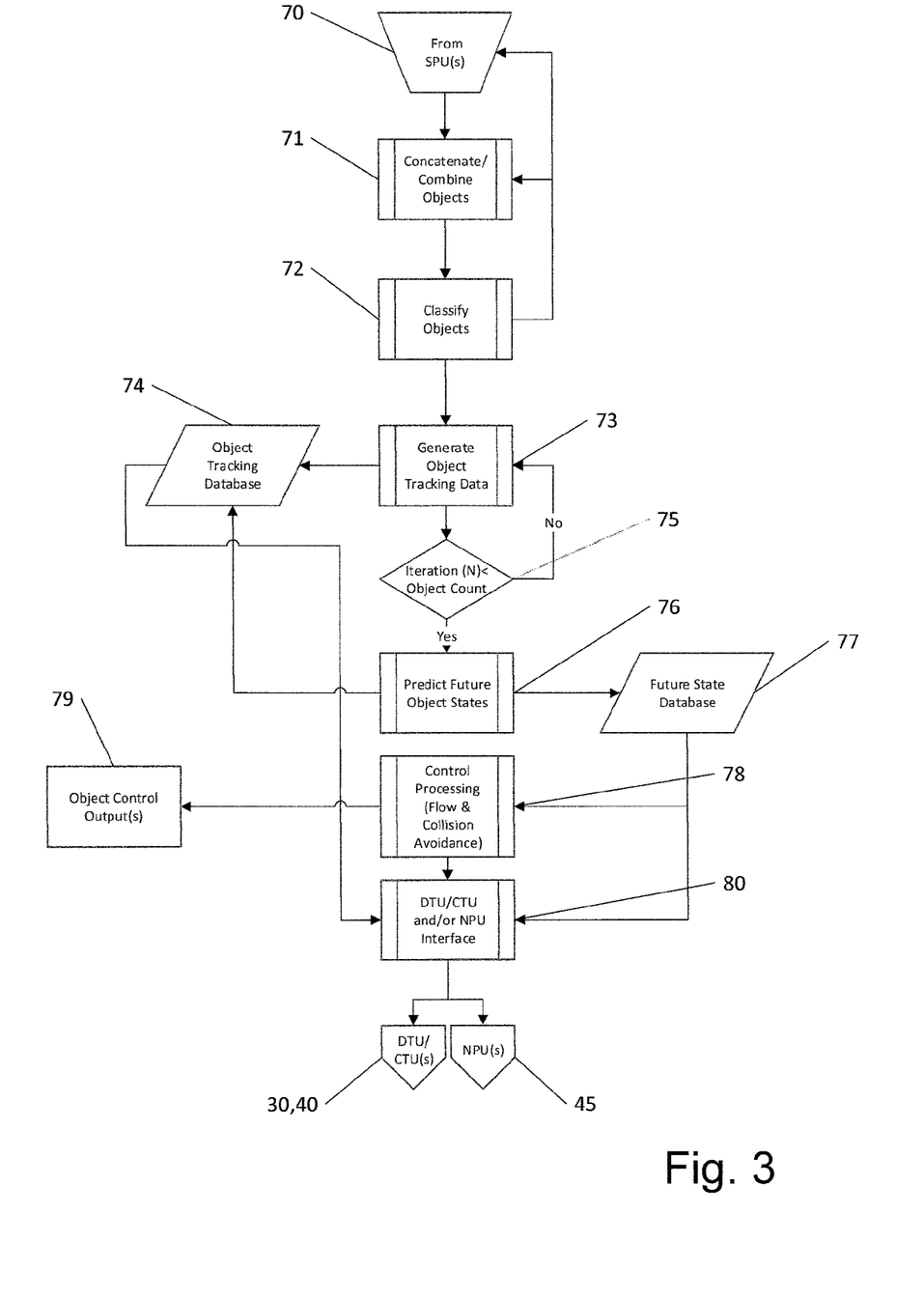
FIG. 3 is a flow chart depicting the operation and functionality of a typical Distributed Tracking Unit (DTU) or Central Tracking Unit (CTU) for use with the system and method illustrated by FIG. 1.
Figure 4:
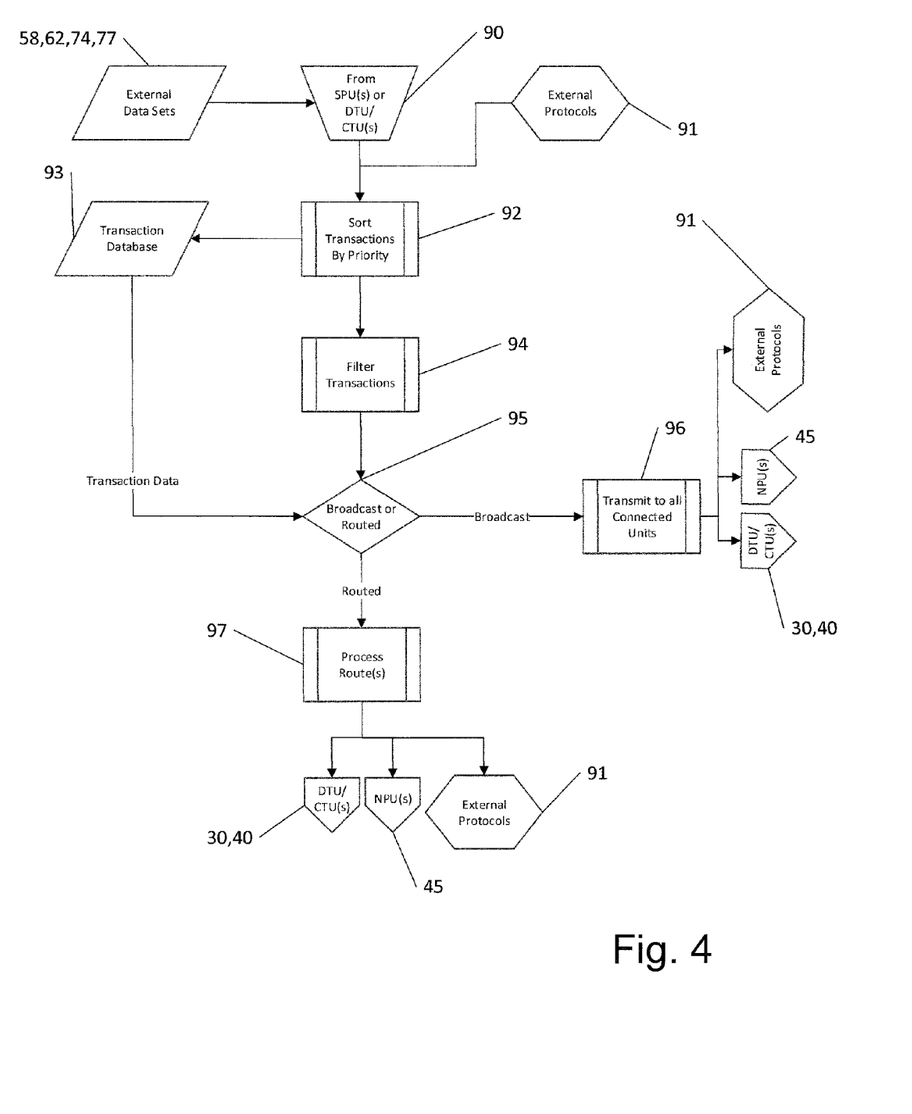
FIG. 4 is a flow chart depicting the operation and functionality of a typical Network Processing Unit (NPU) for use with the system and method illustrated by FIG. 1.

The invention will now be described in greater detail with reference to a particularly advantageous embodiment illustrated in the accompanying drawings. FIG. 1 illustrates an exemplary embodiment of a system and FIGS. 2-4 illustrate an exemplary embodiment of a method according to the present invention wherein vehicle traffic is monitored and traffic signals are controlled to facilitate the safe and efficient flow of vehicle traffic through an intersection. A typical intersection, indicated generally by reference character 10, of converging roadways is shown in FIG. 1. The intersection 10 includes a north-south roadway 12 having northbound vehicle traffic lanes indicated generally by reference characters A, B, C, and southbound vehicle traffic lanes indicated generally by reference characters H, G, F. Intersection 10 further includes an east-west roadway 14 having westbound vehicle traffic lanes indicted generally by reference characters E, F, and eastbound vehicle traffic lanes indicated generally by reference characters I, J. Reference characters A and F further define conventional left-turn lanes and reference characters C, E, H, J further define conventional right-turn lanes, while reference characters B, D, G, I further define through traffic lanes. East-west roadway 14 is configured to have a portion of the roadway converging on the intersection 10 from the east with limited line-of-sight visibility.

One or more three-dimensional (3D) vector imaging sensors (not shown) are associated with each of a plurality of Sensor Processing Units (SPUs) 20 positioned at various locations along the roadways 12, 14. As previously mentioned, vector imaging sensors suitable for use with the invention include by way of example LIDAR, radar, microwave, ultrasonic distance, stereoscopic imaging, time-of-flight (TOF) camera, and the like. Each SPU 20 defines a Field-Of-View (FOV), indicated generally at 25, along the roadway 12, 14 configured to provide visual coverage of a corresponding portion of the roadway. In most instances, the FOVs 25 of adjacent SPUs 20 define an area of overlap, indicated generally by reference character 26. Within an area of overlap 26 between adjacent SPUs 20, the possibility exists that the one or more sensors associated with each SPU may sense the same object at the same time. It should be noted that, as shown herein, most of the FOVs 25 defined by the SPUs 20 are semi-circle shaped, while the FOVs of the SPUs located at the northwest and southeast corners of the intersection 10 define a shape similar to a baseball diamond. Furthermore, the size of the FOVs 25 defined by the SPUs 20 located along the north-south roadway 12 are larger in size. However, the size and shape of the FOVs 25 defined by the SPUs 20 is not essential to the invention and different shapes and sizes of FOVs are likely to be necessary for different intersections. In fact, it is envisioned that the FOVs of the SPUs may need to be customized in order to optimize coverage of the vehicle traffic for a particular intersection.

As will be described in greater detail hereinafter with reference to FIG. 3, one or more of the SPUs 20 may be associated with a Distributed Tracking Unit (DTU), indicated generally by reference character 30. If desired, an SPU may be combined with a DTU at the same location to share a common housing and computational hardware. An SPU combined with a DTU is indicated generally by reference character 35 and is shown in FIG. 1 located at the northwest and southeast corners of the intersection 10. However, the inclusion of one or more DTUs 30 or SPUs/DTUs 35 within the system is optional, and typically, is dependent upon the complexity of the intersection 10 and/or the expected number of tracked objects to be monitored. In a fairly simple situation, the system may be configured to comprise one or more SPUs 20 and a single Central Tracking Unit (CTU), indicated generally by reference character 40. Alternatively, a system according to the present invention may likewise comprise one or more SPUs 20 and a single Network Processing Unit (NPU), indicated generally by reference character 45. The exemplary embodiment of the system shown in FIG. 1 and described in greater detail hereinafter comprises a plurality of SPUs 20 (i.e. nine), a plurality of DTUs 30 (i.e. two, located at the southwest and northeast corners of the intersection 10), a plurality of SPU/DTU combinations 35 (i.e. two, located at the northwest and southeast corners of the intersection 10), and a single CTU 40 and NPU 45 disposed for convenience within the same Traffic Signal Control located at the northeast corner of the intersection 10.

As illustrated in FIG. 2, each SPU 20 is operable to detect, capture and store the node-based object with motion vector data obtained by the three-dimensional (3D) vector imaging sensors associated with the SPU within the FOV 25 defined by the SPU. Step 50 in FIG. 2 represents the process of detecting and capturing objects performed by the SPU 20. As indicated by step 51, the SPU 20 may be required to perform sensor composition, wherein data from multiple sensors is combined to create a single tracked object. By way of example, the SPU 20 may be programmed with the relationship between a LIDAR sensor and a stereoscopic imaging sensor associated with the SPU. If the operational viewing areas of the sensors do not overlap, the SPU is not required to perform composition of the sensors. On the other hand, if the operational viewing areas of the LIDAR sensor and the stereoscopic imaging sensor overlap, the SPU 20 may have to perform sensor composition if both sensors are viewing the same tracked object. As indicated by step 52, the SPU 20 creates a list of objects that have been detected and captured from which the "tracked objects" will be determined. In step 53, the SPU 20 selects an object from the object list to be considered as a possible tracked object. The selected object is passed to an object filter in step 54. At step 55 and step 56, the SPU 20 performs the object filtering. In particular, in step 55 the SPU 20 determines whether the selected object is too small or too large to be considered as a tracked object, for example a bird or an airplane. If the object is too small or too large, the SPU 20 determines the object is not a tracked object, ignores the node-based object with motion vector data for that object, and iterates to select the next object from the object list. In step 56, the SPU 20 identifies static and background objects that are not to be considered as a tracked object, for example traffic signs and buildings. If the object is a static or background object, the SPU 20 determines the object is not a tracked object, ignores the node-based object data with motion vector data for that object, and iterates to select the next object from the object list.

In the event an object passes the object filter step 54, as indicated by "NO" from step 55 and step 56, the SPU 20 determines the object is a tracked object, extracts the object(s) positions at step 57, and stores the data in the object position/size database at step 58. If there is only one set of object position/size data for the tracked object (i.e. N=1), indicated by "NO" from step 59, the SPU 20 selects another object from the object list at step 53 and repeats steps 54 through 58. If instead there is more than one set of object position/size data for the tracked object (i.e. N>1), indicated by "YES" from step 59, the SPU 20 extracts the object(s) vectors from the N−1 and N sets of object position/size data at step 60. At step 61, the SPU 20 then normalizes the object in the event that multiple different sensors were used to detect and capture the tracked object. The SPU 20 stores the object vector data and basic type and/or the normalized object vector data and basic type in the object vector data/basic type database at step 62. Finally, at step 63 the SPU 20 is configured to interface the object databases with one or more DTU(s) 30, CTU(s) 40 and/or NPU(s) 45 as necessary for the system to monitor vehicle traffic and control traffic signals at a particular intersection 10.

As illustrated in FIG. 3 by step 70, node-based object with motion vector data from the SPU(s) 20 is received by a DTU 30, a combined SPU/DTU 35 and/or a CTU 40. As previously mentioned, the DTU 30 is an optional component that is typically used in more complex situations to process data from a subset of one or more SPUs 20 and to make local flow decisions. In the event that the use of a DTU 30 (or similarly, a combined SPU/DTU 35) is unnecessary, the SPU(s) 20 provide the node-based object with motion vector data of the tracked objects directly to a CTU 40. Regardless, if required, the object data from the SPU(s) 20 is concatenated to combine objects at step 71. By way of example, the object data may need to be concatenated if the FOVs 25 of adjacent SPUs 20 overlap in an overlap area 26 and both of the adjacent SPUs have provided object data to the databases for the same tracked object. At step 72, the DTU 30, SPU/DTU 35 and/or the CTU 40 (collectively referred to hereinafter as the "tracking unit") operates to classify the tracked objects. In step 73, the tracking unit 30, 35, 40 generates object tracking data for the tracked object and at step 74 stores the tracking data in the object tracking database. The tracking unit 30, 35, 40 then determines whether the number N of tracked objects is less than the object count at step 75. If the number N is not less than the object count, as indicated by "NO" from step 75, the tracking unit 30, 35, 40 repeats step 73 and step 74 until the number N of tracked objects is less than the object count, as indicated by "YES" from step 75. At step 76, the tracking unit 30, 35, 40 predicts future states of the tracked object and stores the predicted future states in the future states database indicated by step 77. In addition, the tracking unit 30, 35, 40 may update the object tracking data stored in the basic object database at step 74.

The predicted future states of the tracked objects from the future states database is used at step 78 for controls processing. By way of example, the predicted future states of the tracked objects are processed to determine flow and collision avoidance controls. The tracking unit 30, 35, 40 determines the object control output(s), for example the flow and collision avoidance controls, at step 79. Specifically, the tracking unit 30, 35, 40, in this case one or more DTUs, SPU(s)/DTU(s) and/or CTU(s), are operable to produce control outputs 79 that control the flow of tracked objects (i.e. vehicles) in the intersection 10. The control outputs 79 may be simple discrete signals to control a conventional traffic signal, or may be more complex command packets configured to dynamically control an autonomous vehicle's acceleration, deceleration, or direction so that a collision is avoided or a more efficient flow of vehicle traffic is realized. Finally, the object tracking data stored in the object tracking database at step 74, and the predicted future object states stored in the future states database at step 77, are provided to the DTU/CTU and/or NPU interface, indicated by step 80 to be forwarded to one or more subsequent DTU(s)/CTU(s) 30, 40 and/or NPU(s) 45 as required by, for example, the complexity of the system and/or the number N of tracked objects.

In some instances, the system and method may require an NPU 45 to coordinate, store and deliver transaction data and controls to other tracking units connected together within the system. As illustrated in FIG. 4, the external data sets 58, 62, 74, 77 from the SPU(s) 20 or the DTU(s)/CTU(s) 30, 40 are provided to an NPU 45 at step 90. The data sets are used to generate external protocols at step 91. In step 92, the NPU 45 sorts all pending transactions by request priority, and then stores the prioritized transactions in the transactions database in step 93. The NPU 45 filters the transactions at step 94 to detect, identify and discard any duplicates. In step 95 the NPU 45 determines whether the transaction data from the transactions database at step 93 is to be broadcast or routed. In the event that the transaction data is to be broadcast, the NPU 45 transmits the transaction data to all other connected units of various types (other DTU(s)/CTU(s) 30, 40, NPU(s) 45, and external systems) in step 96. In the exemplary embodiment illustrated in FIG. 4, the transaction data may be transmitted to one or more DTU(s)/CTU(s) 30, 40, another NPU 45, or to one or more external protocols 91, so that these other connected units can be advised and utilize the transaction data in further processing. In the event that the transaction data is to be routed, the NPU 45 provides the transaction data to pre-determined process routes in step 97. The use of process routes reduces the need for the NPU 45 to broadcast all transactions by allowing certain data to be routed only to specified recipients. In the exemplary embodiment illustrated in FIG. 4, the transaction data may be routed to one or more DTU(s)/CTU(s) 30, 40, another NPU 45, or to one or more external protocols 91.

While the foregoing general description of exemplary embodiments of the invention and logical organization and propositions are both practical and workable, a skilled practitioner can easily imagine other or more detailed systems and methods that can be configured along the same principles to reach the same functional result. Therefore the present invention should be limited only by the scope of the following claims.

That which is claimed is:

1. A system for monitoring objects and controlling a flow of the objects through a flow point, the system comprising:
   at least one three-dimensional (3D) vector imaging sensor operable for capturing object data relating to an object;
   a Sensor Processing Unit (SPU) associated with the at least one three-dimensional (3D) vector imaging sensor, the SPU being operable for processing the object data relating to the object captured by the at least one three-dimensional (3D) vector imaging sensor to represent the object as a node-based object in the form of a vector image comprised of one or more nodes based on a mathematical expression as opposed to a bitmap image or a raster image, the SPU being further operable for determining a tracked object from a plurality of the node-based objects based on a movement of the node-based object over time and for extracting motion vector data of the tracked object over time to represent the tracked object as a node-based object with motion vector data, wherein the motion vector data is an accumulation of motion data relating to the node-based object represented as a graphically numerical value in the form of a vector; and a Central Tracking Unit (CTU) associated with the SPU, the CTU being operable for classifying the tracked object and for generating object tracking data from the tracked object, the CTU being further operable for predicting a future object state of the tracked object and for generating an object control output for controlling a control signal to thereby facilitate the flow of the tracked object through the flow point.

2. The system of claim 1, wherein the at least one three-dimensional (3D) vector imaging sensor is configured to detect the object and capture the object data relating to the object when the object is located within a Field-Of-View (FOV) defined by the SPU.

3. The system of claim 1, wherein the at least one three-dimensional (3D) vector imaging sensor is selected from the group consisting of a LIDAR, radar, microwave, ultrasonic distance, stereoscopic imaging and a time-of-flight (TOF) camera sensor.

4. The system of claim 1, wherein the SPU is operable to determine at least one of a position, a size, a shape and a current state of the tracked object.

5. The system of claim 1, wherein the SPU is further operable for performing sensor composition of multiple different types of the at least one three-dimensional (3D) vector imaging sensor.

6. The system of claim 1, wherein the SPU is further operable for performing object filtering to identify the tracked object from a plurality of the objects detected by the at least one three-dimensional (3D) vector imaging sensor.

7. The system of claim 1, wherein the SPU is further operable to normalize the node-based object with motion vector data of the tracked object having object data relating to the object captured by a plurality of different types of the at least one three-dimensional (3D) vector imaging sensor.

8. The system of claim 1, wherein the SPU is further operable to interface with at least one of a Distributed Tracking Unit (DTU) and a Network Processing Unit (NPU).

9. The system of claim 8, wherein at least one of the DTU and the CTU is operable for concatenating the object data of when the tracked object is located within an area of overlap of a Field-Of-View (FOV) of a first SPU and a Field-Of-View (FOV) of a second SPU positioned adjacent the first SPU to combine the object data of the tracked object.

10. The system of claim 8, wherein DTU is operable for classifying the tracked object, generating the object tracking data for the tracked object, and predicting the future object state of the tracked object.

11. The system of claim 10, wherein DTU is further operable for processing the object control output for controlling the control signal.

12. The system of claim 8, wherein DTU is further operable to interface with at least one of another DTU, another CTU and another NPU.

13. The system of claim 8, wherein at least one NPU is operable for sorting a plurality of data transactions, filtering the plurality of data transactions, and transmitting the filtered plurality of data transactions to one or more of at least one connected unit of the system.

14. A system for monitoring vehicle traffic and for controlling a traffic signal at an intersection, the system comprising:

at least one three-dimensional (3D) vector imaging sensor configured for capturing object data relating to an object;

a Sensor Processing Unit (SPU) associated with the at least one three-dimensional (3D) vector imaging sensor, the SPU being operable for processing the object data relating to the object to represent the object as a node-based object in the form of a vector image comprised of one or more nodes based on a mathematical expression as opposed to a bitmap image or a raster image, the SPU being further operable for determining a tracked object from a plurality of the node-based objects based on a movement of the node-based object over time and for extracting motion vector data of the tracked object over time to represent the tracked object as a node-based object with motion vector data, wherein the motion vector data is an accumulation of motion data relating to the node-based object represented as a graphically numerical value in the form of a vector; and a Central Tracking Unit (CTU) associated with the SPU, the CTU being operable for classifying the tracked object and for generating object tracking data from the tracked object, the CTU being further operable for predicting a future object state of the tracked object and for generating an object control output for controlling the traffic signal to thereby facilitate the flow of vehicle traffic through the intersection.

15. The system of claim 14, wherein the at least one three-dimensional (3D) vector imaging sensor is configured to detect the object and capture the object data relating to the object when the object is located within a Field-Of-View (FOV) defined by the SPU.

16. The system of claim 14, wherein the at least one three-dimensional (3D) vector imaging sensor is selected from the group consisting of a LIDAR, radar, microwave, ultrasonic distance, stereoscopic imaging and a time-of-flight (TOF) camera sensor.

17. A method for monitoring vehicle traffic and controlling a traffic signal at an intersection, the method comprising:

providing at least one three-dimensional (3D) vector imaging sensor;

providing a Sensor Processing Unit (SPU) operably associated with the at least one three-dimensional (3D) vector imaging sensor;

using the at least one three-dimensional (3D) vector imaging sensor to capture object data relating to an object;

providing the object data relating to the object to the SPU;

using the SPU to process the object data relating to the object to represent the object as a node-based object in the form of a vector image comprising at least one node based on a mathematical expression as opposed to a bitmap image or a raster image, and using the SPU to determine a tracked object from a plurality of the node-based objects based on a movement of the node-based object over time and to extract motion vector data of the tracked object over time to represent the tracked object as a node-based object with motion vector data, wherein the motion vector data is an accumulation of motion data relating to the node-based object represented as a graphically numerical value in the form of a vector;

providing the node-based object with motion vector data to an object database;

providing a Central Tracking Unit (CTU) operably associated with the SPU; and using the CTU to classify the tracked object, to generate object tracking data from the tracked object, to predict a future object state of the tracked object, and to generate an object control output for controlling the traffic signal to thereby facilitate the flow of vehicle traffic through the intersection.

18. The method of claim 17, further comprising selecting the at least one three-dimensional (3D) vector imaging sensor from the group consisting of a LIDAR, radar, microwave, ultrasonic distance, stereoscopic imaging and a time-of-flight (TOF) camera sensor to detect the object and capture the object data relating to the object when the object is located within a Field-Of-View (FOV) defined by the SPU.

* * * * *